(12) United States Patent
Ozturk et al.

(10) Patent No.: US 12,379,218 B2
(45) Date of Patent: Aug. 5, 2025

(54) SYSTEMS AND METHODS FOR ROUTE MANAGEMENT

(71) Applicant: RM ACQUISITION, LLC, Chicago, IL (US)

(72) Inventors: Yusuf Ozturk, Wilmette, IL (US); Ravi Kodavarti, Chicago, IL (US)

(73) Assignee: RM ACQUISITION, LLC, Boise, ID (US)

( * ) Notice: Subject to any disclaimer, the term of this patent is extended or adjusted under 35 U.S.C. 154(b) by 0 days.

(21) Appl. No.: 18/130,215

(22) Filed: Apr. 3, 2023

(65) Prior Publication Data

US 2023/0236023 A1 Jul. 27, 2023

Related U.S. Application Data

(63) Continuation of application No. 16/833,130, filed on Mar. 27, 2020, now Pat. No. 11,619,503.

(Continued)

(51) Int. Cl.
*G01C 21/34* (2006.01)
*G01C 21/36* (2006.01)
(Continued)

(52) U.S. Cl.
CPC ....... *G01C 21/343* (2013.01); *G01C 21/3626* (2013.01); *G01S 19/42* (2013.01); *G07C 5/008* (2013.01); *G07C 5/085* (2013.01)

(58) Field of Classification Search
CPC ... G01C 21/343; G01C 21/3626; G01S 19/42; G01S 5/0027; G07C 5/008; G07C 5/085
(Continued)

(56) References Cited

U.S. PATENT DOCUMENTS 9,704,303 B2 7/2017 Davidson et al.
9,921,070 B1 * 3/2018 Nimchuk ........... G01C 21/3679
(Continued)

OTHER PUBLICATIONS

"Can I see where my package is right now?" retrieved from the internet on Mar. 5, 2019 https://ww.ups/us/en/help-center/sri/follow-my-delivery.page.
(Continued)

*Primary Examiner* — Tyler D Paige
(74) *Attorney, Agent, or Firm* — MARSHALL, GERSTEIN & BORUN LLP

(57) ABSTRACT

Systems and methods for route management are disclosed. A system for use with a communication network includes an electronic logging device, a global positioning device, and a server. The server communicates via a communication network and to access vehicle data and global positioning data via the communication network. The server includes a processor(s) and a non-transitory computer-readable medium storing instructions thereon, that when executed by the one or more processors, cause the processor(s) to: analyze the vehicle data to identify start-and-stop events of the vehicle; analyze each of the start-and-stop events with respect to criteria to identify which of the start-and-stop events is associated with an actual visit event; identify the locations and the times from the global positioning data that correspond to the actual visit events; and correlate the locations and the times of the vehicle with the respective ones of the actual visit events.

11 Claims, 5 Drawing Sheets

Related U.S. Application Data

(60) Provisional application No. 62/825,687, filed on Mar. 28, 2019.

(51) Int. Cl.
   *G01S 19/42* (2010.01)
   *G07C 5/00* (2006.01)
   *G07C 5/08* (2006.01)

(58) Field of Classification Search
   USPC .......................................................... 701/420
   See application file for complete search history.

(56) References Cited

U.S. PATENT DOCUMENTS

| | | | |
|---|---|---|---|
| 2012/0253892 A1* | 10/2012 | Davidson | G06Q 10/0631 705/7.42 |
| 2012/0323690 A1 | 12/2012 | Michael et al. | |
| 2013/0289873 A1* | 10/2013 | Mitchell | G06Q 10/08 701/482 |
| 2014/0046585 A1 | 2/2014 | Morris, IV et al. | |
| 2015/0081399 A1* | 3/2015 | Mitchell | G08G 1/20 705/7.38 |
| 2015/0278759 A1 | 10/2015 | Harris et al. | |
| 2016/0358129 A1* | 12/2016 | Walton | G06Q 40/08 |
| 2016/0370184 A1* | 12/2016 | Battista | G01C 21/20 |
| 2017/0262804 A1 | 9/2017 | Shroff et al. | |
| 2018/0240067 A1* | 8/2018 | Oz | G07C 9/00182 |
| 2020/0309544 A1 | 10/2020 | Ozturk et al. | |

OTHER PUBLICATIONS

"Delivery Truck Tracking Helps DR Sherry" retrieved from the internet on Mar. 5, 2019 https://www.verizonconnect.com/resources/case¬study/drsherry/.

"Food & Beverages Truck Tracking Devices _ GoFeet" retrieved from the internet on Mar. 5, 2019 http://www.gofleet.com/food-and-beverages-truck-tracking-devices.

"Freight and Courier Software Management Systems" retrieved from the internet on Mar. 5, 2019 http://www.fujitsu.com/nz/services/application-services/freight-courier-systems/.

"Mobile Dispatch_Dispatch, Track and Monitor" Retrieved from the internet on Mar. 5, 2019 http://www.gofleet.com/product/mobile-dispatch.

"Monitoring Truck transportation" retrieved from the internet on Mar. 5, 2019 https://www.positrex.com/en/truck-transportation/.

"Orion Backgrounder" retrieved from the internet on Mar. 5, 2019 https://pressroom.ups.com/pressroom/ContentDetailsViewer.page?ConceptType=FactSheet&id=1 426321616277-282.

"Paragon Route Execution_Route planning & vehicle tracking" retrieved from the internet on Mar. 5, 2019 https://www.paragontruckrouting.com/our-products/paragon-live-real-time-vehicle-tracking/route-execution.

"Delivery Fleet Management Made Easier" retrieved from the internet on Mar. 5, 2019 https://www.gofleet.com/delivery-fleet-managemnt-made-easier/.

"Delivery Truck Tracking Systems_Track Delivery Trucks from Anywhere" retrieved from the internet on Mar. 5, 2019 https://gofleet.com/delivery-truck-tracking-systems.

"Dispatch Drivers & Send Messages Safely_GoFleet" retrieved from the internet on Mar. 7, 2019 https://www.gofleet.com/dispatch.

"Geotab-GO7" Brochure-GoFleet Mar. 5, 2019.

"Courier & Delivery_Fleet Management Solutions" Brochure Mar. 7, 2019.

"Introducing A Better Way To Dispatch" Retrieved from the Internet on Mar. 7, 2019 https://www.samsara.com/blog/introducing-a-better-way-to-dispatch.

"Samsara-Telematics" Retrieved from the internet on Mar. 5, 2019 https://www.samsara.com/page/telematics?utm_source=google&utm_campaign=telematics&utm_medium=search&utm_content=p&umt_term=telemat.

"Telematics Sensor-Equipped Trucks Help UPS Control Costs-Green Fleet- Automotive Fleet" Retrieved from the Internet on Mar. 5, 2019 https://www.automotive-fleet.com/146706/telematics-sensor-equipped-trucks-help-ups-control-costs.

"To Increase Productivity, UPS Monitors Drivers' Every Move: Planet Money: NPR" Retrieved from the Internet on Mar. 5, 2019 https://www.npr.org/sections/money/2014/04/17/303770907/to-increase-productivity-ups-monitors-drivers-every-move.

"XT-2000 OBD Real-Time GPS Vehicle Tracker" Retrieved from the Internet on Mar. 5, 2019 https://www.spytec.com/xt-2000-obd-real-time-gps-vehicle-tracking-device.html?campaignid=176620368&adgroupid=36337447912&Key.

"OptimoRoute—Route and Schedule Planning and Optimization—For Delivery and Field Service" Retrieved from the Internet on Mar. 5, 2019 https://optimoroute.com/?gclid=EAlalQobChMIjrT4xqbs4AIVRL7ACh1UVQgNEAAYAiAAEgLRYPD_BwE.

* cited by examiner

SYSTEMS AND METHODS FOR ROUTE MANAGEMENT

This application is a continuation of U.S. application Ser. No. 16/833,130 filed Mar. 27, 2020, entitled "Systems and Methods for Route Management," which claims priority to U.S. Provisional Application No. 62/825,687, filed Mar. 28, 2019, entitled "Systems and Methods for Electronic Data Logging," the entire disclosures of which are hereby expressly incorporated by reference herein.

FIELD OF THE DISCLOSURE

The present patent relates generally to route management and, in particular, to systems and methods for route management.

BACKGROUND

Previous electronic data logging systems are used to identify a route a vehicle has taken, a status of the vehicle, accident information, and/or maintenance problems of the vehicle. This information may allow fleet managers to perform preventative maintenance on fleet vehicles and ensure that fleet vehicles and their drivers are complying with traffic laws and/or governmental regulations.

Many times fleets have trucks that go on routes to delivery packages at various addresses. Sometimes it is difficult to know whether a driver has been to each of the addresses or has been otherwise delayed. However, known electronic data logging systems have not been used to solve these problems.

SUMMARY

Route management systems analyze data collected from vehicles and determine whether scheduled deliveries and/or appointments have been accomplished. To do so, the first step includes the route management system generating a schedule including scheduled visit events (predetermined stops) for deliveries and/or appointments to be made by a vehicle and the second step includes the route management system assigning a vehicle to complete the scheduled visit events and providing the scheduled visit events and/or the associated schedule to the vehicle. The third step includes the route management system obtaining data from a vehicle while and/or after the vehicle is traversing the route and the fourth step includes the route management system analyzing the data to determine if various predetermined criteria have been met. The predetermined criteria may include determining if the vehicle has stopped at all the scheduled visit events, how much time the vehicle spent at the scheduled visit events, whether they skipped scheduled visit events, etc. The fifth step includes the route management system updating the schedule based on the criteria being met and the sixth step includes the route management system generating a report, an alert, or some other information delivered to the user in some way.

During the first step of generating the predetermine schedule, the route management system may generate a schedule including scheduled visit events for deliveries and/or appointments. The route management system may generate criteria to determine if a vehicle is at one of the scheduled visit events. In an example, the route management system defines a geographic area around each of the scheduled visit events via, for example, a geofence. The route management system may use user input or other data to define the geographic area. During the step of determining if various criteria have been met, the route management system uses the data collected from the vehicle to determine if and when the vehicle is within one of the geographic areas and how long the vehicle is within that geographic area. During the step of updating the schedule, the route management system may use the presence of and the length of time spent by the vehicle within the geographic area to update the scheduled events record based on scheduled visit events completed.

In a particular example, a route management system for use with a communication network includes an electronic logging device, a global positioning device, and a server. The electronic logging device is physically coupled to a bus of a vehicle and captures vehicle data from the bus. The global positioning device is carried by the vehicle and captures global positioning data of the vehicle. The global positioning data is indicative of locations of the vehicle and times that the vehicle is at the respective locations. The server accesses the vehicle data and the global positioning data via the communication network. The server includes one or more processors and a non-transitory computer-readable medium coupled to the one or more processors and storing instructions thereon, that when executed by the one or more processors, cause the one or more processors to analyze the vehicle data to identify start-and-stop events of the vehicle. The instructions also analyze each of the start-and-stop events with respect to predetermined criteria to identify which of the start-and-stop events is associated with an actual visit event and identify the locations and the times from the global positioning data that correspond to the actual visit events. Furthermore, the instructions correlate the locations and the times of the vehicle with the respective ones of the actual visit events.

The route management system may also include a route database that stores a scheduled visit events record which identifies scheduled visit events and geographic areas around the scheduled visit events. In one example, the geographic areas may be defined by the geofences. In another example, the geographic areas may be defined by a user.

In the step of generating a schedule including scheduled visit events, the route management system may cause the one or more processors to perform tasks such as generating the scheduled visit events record and defining the geographic areas around the scheduled visit events. In the step of assigning a vehicle to complete the scheduled visit events, the route management system may assign a vehicle to one or more of the scheduled events. The route management system may assign the scheduled events to the vehicle in different ways. For example, the vehicle may be assigned to a scheduled event based on one or more of a proximity of the vehicle to the one or more of the scheduled visit events, a travel time between the vehicle and the one or more of the scheduled visit events, or based on other criteria.

In the step of analyzing the data to determine if predetermined criteria have been met, the route management system may compare the locations of the actual visit events to the geographic areas around the scheduled visit events to identify the locations of the actual visit events that are within the geographic areas around the scheduled visit events.

The route management system may track actual visit events to include the durations that the vehicle was at the actual event and the time window that the vehicle was at the actual event. During the step of analyzing the data, the route management system may also compare durations of the actual visit events to the corresponding time windows to identify ones of the durations that are greater than the time window and, more generally, to determine if the actual visit event complied with parameters of the scheduled visit event. In the step of updating the schedule based on the criteria being met, the route management system may update the scheduled visit events record to include the locations and the times for the scheduled visit events that have corresponding actual visit events.

The route management system may also generate one or more alerts that identify the actual visit events having the duration that is greater than the time window allotted for the scheduled visit event and/or identify the scheduled visit events that do not correspond to one of the actual visit events. Thus, the route management system may determine if the actual delivery complied with the scheduled delivery time. Moreover, the route management system may also cause the one or more processors to generate a report identifying the scheduled visit events that correspond to one of the actual visit events and the scheduled visit events that do not correspond to one of the actual visit events.

In another example, a system that accesses vehicle data of a vehicle and global positioning data including locations of the vehicle and times that the vehicle is at the locations, via a communication network, includes a route database and a server. The route database stores a scheduled events record that identifies scheduled visit events and geographic areas around the scheduled visit events. The server communicates via the communication network and accesses the vehicle data and the global positioning data via the communication network. The server includes one or more processors and a non-transitory computer-readable medium coupled to the one or more processors and storing instructions thereon, that when executed by the one or more processors, cause the one or more processors to analyze the vehicle data to identify start-and-stop events of the vehicle and analyze each of the start-and-stop events with respect to criteria to identify which of the start-and-stop events is associated with an actual visit event. The instructions also identify the locations and the times from the global positioning data that correspond to the actual visit events and correlate the locations and the times of the vehicle with the respective ones of the actual visit events. The instructions also compare the locations of the actual visit events to the geographic areas around the scheduled visit events to identify the locations of the actual visit events that are within the geographic areas around the scheduled visit events and correlate the locations and the times of the actual visit events with the associated ones of the scheduled visit events.

DETAILED DESCRIPTION

Figure 1:
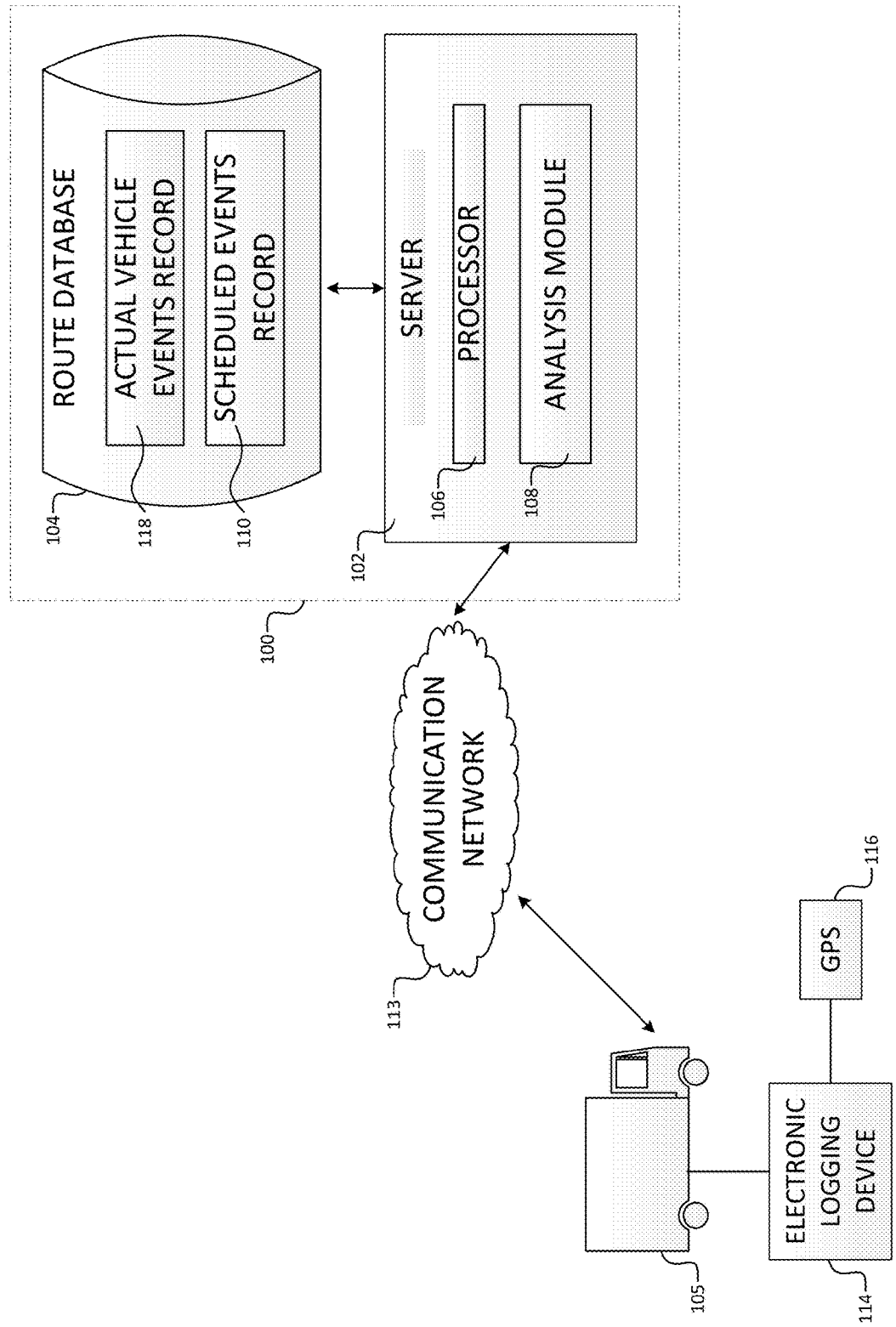
FIG. 1 is a schematic illustration of a route management system including an example route management system that includes a server and a route database.

Turning to FIG. 1, an example route management system 100 is shown as including a server 102 and a route database 104 that operate to track and manage routes and deliveries of a vehicle 105 in order to determine if the vehicle 105 has completed scheduled visit events.

To manage the routes and further to the summary above, the server 102 performs the first step by generating a schedule including scheduled visit events including deliveries and/or appointments to be completed during a time period and performs the second step by assigning the vehicle 105 to complete the scheduled visit events. The server 102 may provide the scheduled visit events and/or the associated schedule to the vehicle 105. The server 102 performs the third step by obtaining data from the vehicle 105 while and/or after the vehicle 105 is traversing the route and the server 102 performs the fourth step by analyzing the data to determine if predetermined criteria have been met. In an example, the server 102 may analyze the data by identifying the locations of the vehicle 105 at actual visit events of the vehicle 105 and corresponding dates, times, and/or durations of the actual visit events, where the actual visit events may correspond to a scheduled visit event being completed.

In the example shown, the server 102 is communicatively coupled to the route database 104. The server 102 may generate data that may be stored at or accessed from the route database 104. While the route management system 100 is mentioned including both the server 102 and the route database 104, the route management system 100 may instead include the server 102 but not the route database 104. Other components may be included with the route management system 100 such as an electronic data logging device, a global positioning device, etc., which are discussed in more detail below.

Referring now to the server 102, the server 102 includes a processor 106 and an analysis module 108. Generally, the processor 106 may execute the analysis module 108 to perform the first, second, third, fourth, and fifth steps to determine if scheduled visit events on a delivery or service route have been completed. The analysis module 108 performs the first step by generating a scheduled events record 110 that may identify scheduled visit events (predetermined stops) and geographic areas, via geo-fencing, around each of the scheduled visit events. The scheduled events may be associated with local distribution or long-haul distribution and a delivery and/or a service call. The scheduled events record 110 is shown being stored in the route database 104.

The analysis module 108 may perform the second step by assigning the vehicle 105 to complete certain ones of the stops (the scheduled visit events). The server 102 may perform the third step by accessing vehicle data and the global positioning data that is associated with the vehicle 105. The server 102 may access the data via a communication network 113.

To allow the server 102 to access the vehicle data, an electronic logging device 114 is coupled to the vehicle 105 that can obtain the vehicle data which may relate to operating the vehicle 105. Some of the vehicle data may relate to starting data, stopping data, vehicle turning-on data, vehicle turning-off data, etc. A global positioning device 116 is carried by the vehicle 105 that can obtain the global positioning data that includes locations of the vehicle 105 and times that the vehicle 105 is at the locations.

The analysis module 108 may perform the fourth step by identifying start-and-stop events of the vehicle 105 and which of those start-and-stop events corresponds to an actual visit event. To do so, the analysis module 108 analyzes the data to identify all events where the vehicle 105 stops and/or starts such as, for example, when the vehicle 105 stops at a traffic light, is in a traffic jam, is refueling, turns on, turns off, and/or is not moving. The analysis module 108 may identify or differentiate an actual visit event from a routine start-and-stop event by identifying those start-and-stop events that lasted over a threshold period of time. For example, the analysis module 108 may identify that an actual visit occurred if the vehicle 105 is turned off for over two minutes. The actual visit events may be associated with the vehicle 105 completing a delivery and/or completing a service call.

Once the actual visit events are identified, the analysis module 108 identifies the locations and the times that correspond to the actual visit events. In performing the fourth step, the analysis module 108 may correlate the locations and the times of the vehicle 105 with the corresponding actual visit event. As a result, after the correlation is completed, each actual visit event may have an associated location and time.

The locations may include X-coordinates, Y-coordinates, and/or addresses corresponding to a physical location of the vehicle 105 on a route and/or within a time period. The times may include a date that the actual visit event occurred and the start (e.g., an arrival time), the end (e.g., a departure time), and/or a duration of the actual visit event. While the server 102 is mentioned correlating the locations, the times, and the actual visit events, in other examples, the electronic logging device 114 may correlate the locations, the times, and the actual visit events.

To determine if the predetermined stops on the route have been completed, the analysis module 108 identifies the locations of the actual visit event that are within the geographic areas (geofences) around the scheduled visit events. To do so, the analysis module 108 may compare the locations of the actual visit events to the geographic areas around the scheduled visit events. As an example, an actual visit event may correspond to a scheduled visit event when the location of the actual visit event is within a geofence surrounding the scheduled event. However, an actual visit event may not correspond to a scheduled visit event when the location of the actual visit event is outside of a geofence surrounding the scheduled event.

To associate the related visit event data, the analysis module 108 may correlate the locations and the times of the actual visit events with the corresponding scheduled visit events. The analysis module 108 may also generate an actual vehicle events record 118 including the correlated data. Thus, the actual vehicle events record 118 may include the correlated actual visit events data and, more generally, include the locations of the vehicle 105 at the actual visit events and the corresponding dates, times and/or durations of the actual visit events. The scheduled events record 110 and the actual vehicle events record 118 may be stored in the route database 104.

Figure 2:
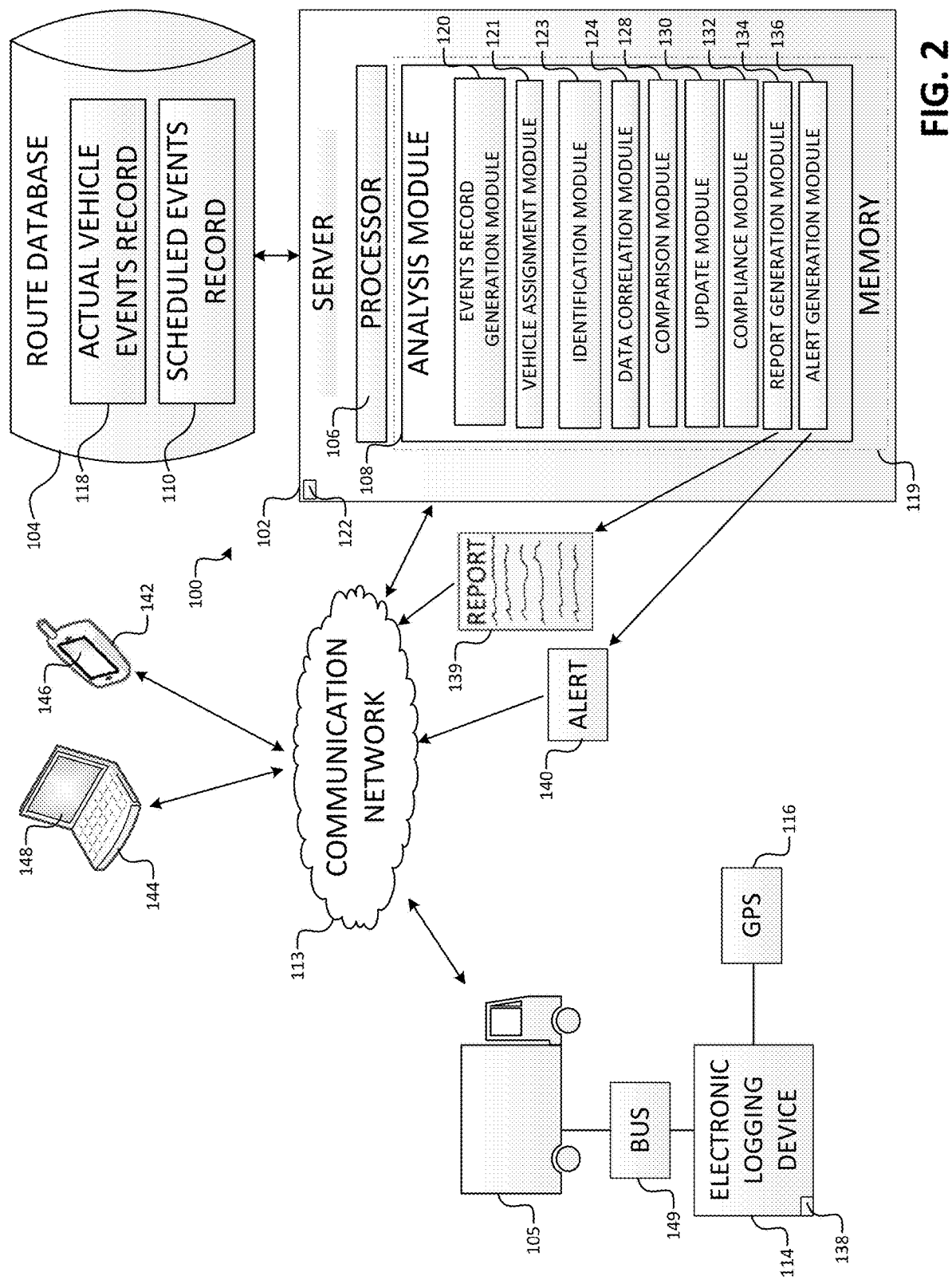
FIG. 2 is a more detailed view of the example route management system of FIG. 1 and specifically, of an analysis module and a memory storing the analysis module, as well as a vehicle and a communication network

FIG. 2 is a more detailed view of the example route management system 100 of FIG. 1 and specifically, of the analysis module 108 and a memory 119 storing the analysis module 108. The vehicle 105 and the communication network 113, which may or may not be part of the route management system 100, are also shown.

Generally, the analysis module 108 operates on the data to analyze and determine that the scheduled visit events have been completed and to generate alerts and reports to notify users, accordingly. In an example, the analysis module 108 generates the scheduled events record 110 and assigns the vehicle 105 to the scheduled events. To do so, the analysis module 108 includes an events record generation module 120 that performs the first step of generating the scheduled events record 110 and a vehicle assignment module 121 that performs the second step of assigning the vehicle 105 to the respective events.

In the example shown, the events record generation module 120 generates the scheduled events record 110 that may include the scheduled visit events for the vehicle 105 or another vehicle and the defined geographic areas (e.g., geo-fences) around the scheduled visit events. The geographic areas may be automatically defined based on a perimeter of the property, a parking lot at the address, an area within a threshold (e.g., two blocks) of the address, other factors, or in any desired manner. However, the geographic areas may be defined in different ways such as based on user input.

The events record generation module 210 may generate a time window for each scheduled visit event and associate the time window with the corresponding scheduled visit event such that the scheduled visit event and the associated time window may be stored in the scheduled events record 110. The events record generation module 210 may assign different time windows for different scheduled visit events. For example, the events record generation module 210 may determine the time window based on the scheduled visit event being performed. As an example, if the scheduled visit event involves unloading a semi-trailer, the events record generation module 210 may set the time window to approximately 30 minutes. However, if the scheduled visit event includes delivering a single pallet, the events record generation module 210 may set the time window to approximately 10 minutes. In an example, the time window includes a delivery time window (when the event will occur) that a customer has agreed to unload the vehicle 105 within and/or an estimated duration (how long the event will take) of the scheduled visit event that is to occur. The time window may also identify when the scheduled visit event is to occur.

The vehicle assignment module 121 may assign the vehicles to the respective scheduled events. The vehicle assignment module 121 may inform the vehicle 105 of which scheduled visit events that the vehicle 105 is to perform by allowing the vehicle 105 or an associated device (e.g., a smart device) access to the scheduled events record 110. The vehicle 105 may alternatively receive the scheduled events record 110 from the vehicle assignment module 121.

In some examples, the vehicle assignment module 121 assigns the vehicle 105 to the scheduled visit event based on a proximity of the vehicle 105 to the location of the scheduled visit event, a travel time between the current location of the vehicle 105 and the location of the scheduled visit event, an arrival time of the vehicle 105 at the location of the scheduled visit event, and/or based on other factors. As an example, the vehicle assignment module 121 may assign the vehicle 105 to the scheduled visit event based on the job currently being performed by (or assigned to) the vehicle 105 and/or the location of the vehicle 105. The vehicle assignment module 121 may also assign the vehicle 105 to the scheduled visit event based on user input.

The analysis module 108 also accesses the vehicle data. To do so, the analysis module 108 performs the third step by accessing the vehicle data from the electronic logging device 114 using a communication interface 122 of the server 102.

The analysis module 108 determines which of the scheduled visit events have been completed. To do so, the analysis module 108 includes an identification module 123, a data correlation module 124, and a comparison module 128 that operate together to perform the fourth step by identifying stop-and-start events and actual visit events, associating the actual visit events with the corresponding locations and times, and determining if the scheduled visit events have been completed.

In response to the analysis module 108 or, for example, the identification module 123, accessing the vehicle data, the identification module 123 analyzes the vehicle data with respect to criteria to identify, for example, start-and-stop events of the vehicle 105. In an example, the electronic logging device 114 includes a communication interface 138 such as, for example, a Bluetooth® interface, a Wi-Fi Interface, a cellular interface (e.g., a cellular communication module), etc. that allows the analysis module 108 and/or the identification module 123 to access vehicle data.

As an example of analyzing the vehicle data, the identification module 123 determines which of the stop-and-stop events is associated with an actual visit event. In some examples, the identification module 123 analyzes the start-and-stop events with respect to the criteria to identify which of the start-and-stop events is associated with an actual visit event. Some criteria may include whether the vehicle 105 is turned off, whether the vehicle 105 is turned on, whether a speedometer of the vehicle 105 is zero for a threshold amount of time, whether wheels of the vehicle 105 are not rotating for a threshold amount of time, whether a transmission status of the vehicle 105 is in park, or whether the identified location of the vehicle 105 is substantially the same for a threshold amount of time. As an example, the identification module 123 may determine that a start-and-stop event is not associated with an actual visit event when the vehicle 105 is determined to have merely stopped at a stop sign.

In response to the identification module 123 identifying which of the stop-and-stop events are actual visit events, the identification module 123 identifies the locations and the times that correspond to the actual visit events. The identification module 123 may access the locations and times from the global positioning device 116 via, for example, the communication interface 122.

Once the corresponding locations and times of the vehicle 105 are identified, the data correlation module 124 correlates the actual visit event with the corresponding locations and times that the vehicle 105 was at the locations. In an example, the data correlation module 124 associates the actual visit event with the corresponding locations and times of the vehicle 105 by adding an identifier to each actual visit event and each corresponding location and time or by otherwise tagging the data.

After the data correlation module 124 correlates the actual visit event with the corresponding locations and times of the vehicle 105, the events record generation module 120 accesses and uses the correlated actual visit events data to generate the actual vehicle events record 118. As mentioned above, the actual visit events data may include, for example, the locations of the vehicle 105 at the actual visit events and the corresponding dates, times, and/or durations of the actual visit events.

Using the actual visit events identified by the identification module 123 and the corresponding locations and times correlated therewith, the comparison module 128 compares the locations (e.g., X-coordinates, Y-coordinates) of the actual visit events to the geographic areas of the scheduled visited events to determine if the vehicle 105 performed one or more of the scheduled visit events. The comparison module 128 may determine that a scheduled visit event has been completed based on predetermined criteria being met. The criteria may include, for example, a duration of the actual visit event being within a threshold of an estimated duration for the scheduled visit event to be completed and/or the vehicle being within the geographic area around the scheduled visit location for a threshold amount of time. Other criteria may additionally or alternatively be used. As an example, the comparison module 128 may determine that a scheduled visit event was completed when the locations of the actual visit events are within the geographic areas around and/or defining the scheduled visit events.

The analysis module 108 also updates the scheduled events record 110 based on the determination regarding which of the scheduled visit events have been completed and which of the scheduled visit events have not been completed. To do so, the analysis module 108 includes an update module 130 that performs the fifth step by updating the scheduled events record 110 by, for example, populating the completed scheduled visit events to include the locations and the times that the actual visit event occurred. The locations may include the address of the actual visit event and/or the scheduled visit event and the time entries may include a time and date that the actual visit event began (e.g., arrival time), the time and the date that the actual visit event ended (e.g., departure time), and/or a duration between the start time and the end time.

The analysis module 108 also determines if the completed scheduled visit events complies with criteria. To do so, the analysis module 108 includes a compliance module 132 that, for example, compares an actual duration of the actual visit event to a time window assigned to the scheduled visit event to determine if the actual duration is greater than the time window or, more generally, determines if terms of the scheduled visit event were complied with.

As an example, the compliance module 132 may determine that a grocery store did not comply with a delivery window when the grocery store unloads the vehicle 105 in four hours but agreed to unload the vehicle in two hours. Based on the non-compliance, the owner and/or manager of the vehicle 105 may use this information to seek costs from the grocery store for not being in compliance with the agreement. Additionally, the compliance module 132 may generate a tally of non-compliance and compliance for the grocery store across one or more vehicles (e.g., a fleet) to identify a record of non-compliance and compliance. Determining compliance may include the compliance module 132 comparing the start and/or stop times of the actual visit event to the time window and/or scheduled times of the scheduled visit event to determine if the actual visit event occurred when it was scheduled to occur.

The analysis module 108 also generates information such as a report and/or an alert that can be delivered to a user in some way. To do so, the analysis module 108 includes a report generation module 134 and an alert generation module 136 that perform the sixth step by generating a report(s) 139 and generating an alert(s) 140, respectively. The report 139 may identify the scheduled visit events that have in fact been visited and the scheduled visit events that have not been visited. The alert 140 may include an e-mail, a text message, an audio alert, etc. and may identify scheduled visit events that have not been completed and/or actual visit events that are non-compliant (e.g., outside of a delivery window).

The report generation module 134 may transmit the report 139 and the alert generation module 136 may transmit the alert 140 to an electronic device 142 or a computer 144 via the communication network 113. The electronic device 142 may be a mobile device, a cellular and/or mobile smart phone, a tablet, a computer (e.g., a laptop), a wearable device (e.g., a smart watch), an internet appliance, etc.

In the example shown, the electronic device 142 and the computer 144 include displays 146, 148 that allow for the report 139, the alert 140, the actual vehicle events record 118, and/or the scheduled events record 110 to be viewable on the devices 142, 144. The electronic device 142 and/or the computer 144 may be disposed within the vehicle 105. As an example, the electronic device 142 and/or the computer 144 may be a component of the vehicle 105 (e.g., the display 146 and/or 148 may be incorporated into a dashboard of the vehicle 105 or otherwise included within the vehicle 105).

The report generation module 134 may provide the report 139 to the devices 142 and/or 144 on a requested interval and/or at any time. For example, the report 139 may be provided every time one of the scheduled visit events has been completed or may be provided as a daily summary. The report generation module 134 can tailor the frequency that the report 139 is provided to the customer. As an example, the report generation module 134 may provide menus and/or selectable icons that allow a user to tailor the information contained in the report 139 and/or the frequency that the report 139 is obtained.

As also detailed in FIG. 2, the electronic logging device 114 is physically coupled to a bus 149 of the vehicle 105. The bus 149 may allow the electronic logging device 114 to access the vehicle data. The bus 149 may be a OBDII protocol bus, a J1939 protocol bus, a J1708 protocol bus, etc. and the electronic logging device 114 may be an electronic on-board recorder (EOBR), a cellular telematics device, a plug-and-play device, and/or an engine-data collection module.

While the electronic logging device 114 is described as being coupled to the bus 149, the electronic logging device 114 may alternatively be integrated into the vehicle 105 and/or coupled to an electronic control module of the vehicle 105 such as an engine control module, a body controller, etc. While the communication interface 115 is described above as being part of the electronic logging device 114, the communication interface 115 may alternatively be carried by the vehicle 105 or by the electronic device 142 (or a similar device). In such examples, the data may be provided to the communication interface 115 via a near-field communication interface such as a wireless communication interface (e.g., Wi-Fi interface, a Bluetooth® interface) of the electronic logging device 114.

The vehicle 105 may be any type of vehicle. For example, the vehicle 105 may be a manned vehicle or a unmanned vehicle, a ground-based vehicle, an air-based vehicle, and/or a water-based vehicle. The vehicle 105 may be a commercial vehicle such as a truck or a bus, a motorcycle, a watercraft such as a boat or a ship, an aircraft such as an airplane, a helicopter, or an unmanned aerial vehicle (UAV) sometimes referred to as a drone, an electric vehicle, and/or a manually-powered vehicle such as bicycle. While the vehicle 105 is illustrated as a manned commercial vehicle, the vehicle 105 may be an autonomous vehicle or a manned vehicle or any of the aforementioned types of vehicles.

Figure 3:
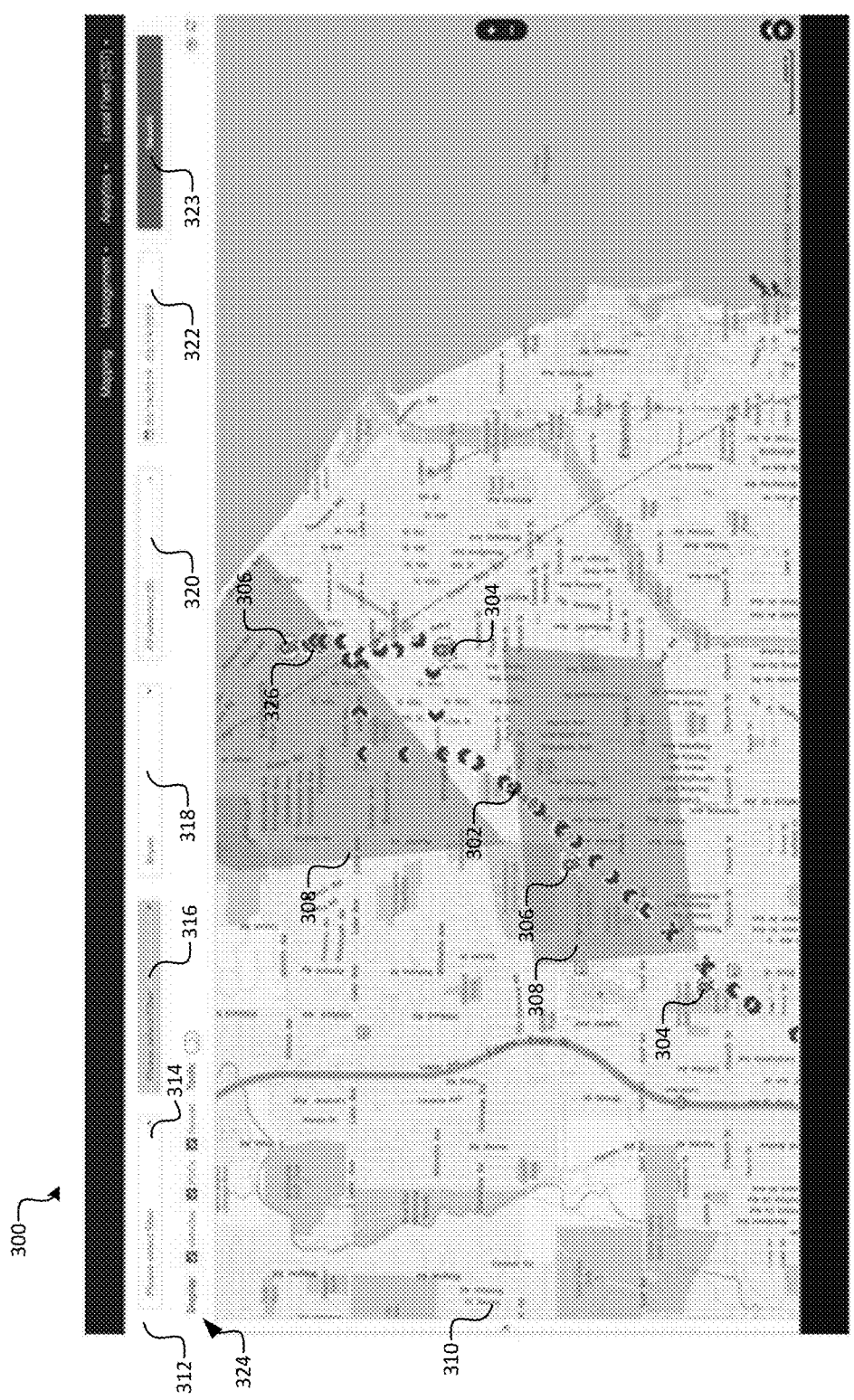
FIG. 3 is a screen shot that may be provided by the route management system of FIG. 1 showing a route taken by a vehicle and identifying actual visit events and geographic areas designated by geofencing around the scheduled visit events.

FIG. 3 is a screen shot 300 that may be provided by the route management system 100 of FIG. 1 showing a route 302 taken by a vehicle that identifies actual visit events 304, 306, and geographic areas designated by geofencing 308 around scheduled visit events. The route 302, the actual visit events 304, 306, and the geofencing 308 are included in a map section 310 of the screen shot 300. The route 302 taken may be identified by chevrons and the actual visit events 304, 306 may be identified by droplets. The actual visit events 306 within the geofencing 308 indicates that a scheduled visit event has been completed while the actual visit events 304 outside of the geofencing 308 are not related to a scheduled visit event.

A dropdown menu section 312 is also included in the screen shot 300. The dropdown menu section 312 includes various dropdown menus or data entry fields 314, 316, 318, 320, 322, 323, 324 that can be used by a user to filter the results displayed on the map section. For example, the drop-down menu 318 allows for a driver to be selected and the drop-down menu 320 allows for vehicle events of interest to be selected for display on the map section 310. If an event of interest occurs, a red chevron 326 may be displayed that provides a visual indication of the event of interest occurring (e.g., speeding). Some events of interest may include hard breaking, ignition off, ignition on, location, over idling, over posted speed limit, and vehicle stop.

The date fillable box 322 allows a user to select a date range or a specific date range to query and have displayed on the map section 310. The selection section 324 allows the user to select whether vehicles, points of interested, and/or the geofences 308 are displayed on the map section 310. Once the desired criteria on the dropdown men section 312 has been entered and selected, the search icon 323 may be selected and the results may thereafter be displayed on the map section 310.

Figure 4:
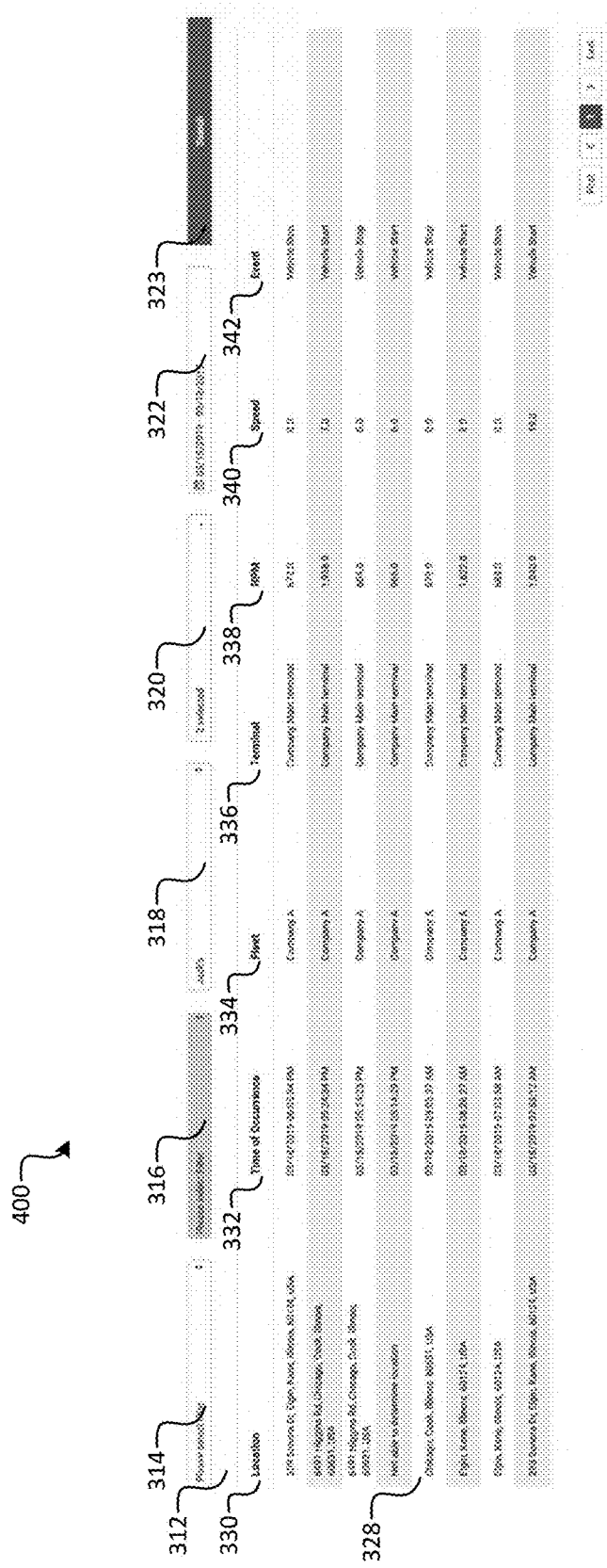
FIG. 4 is a screen shot that may be provided by the route management system of FIG. 1 showing an example of the actual vehicle events record.

FIG. 4 is a screen shot 400 that may be provided by the route management system 100 of FIG. 1 showing an example of the actual vehicle events record 118. The screen shot 400 includes the dropdown menu section 312 of FIG. 3 and also includes a spreadsheet section 328. The spreadsheet section 328 includes various columns providing additional details about a start-and-stop event identified. For example, the columns 330, 332 indicate the address and the time of when and where the event occurred. Additional information provided in the other columns 334, 336, 338, 340, 342 may include the fleet name, the terminal, the RPM's of the associated vehicle, the speed of the vehicle, and/or the type of event that occurred (e.g., a start event, a stop event).

Figure 5:
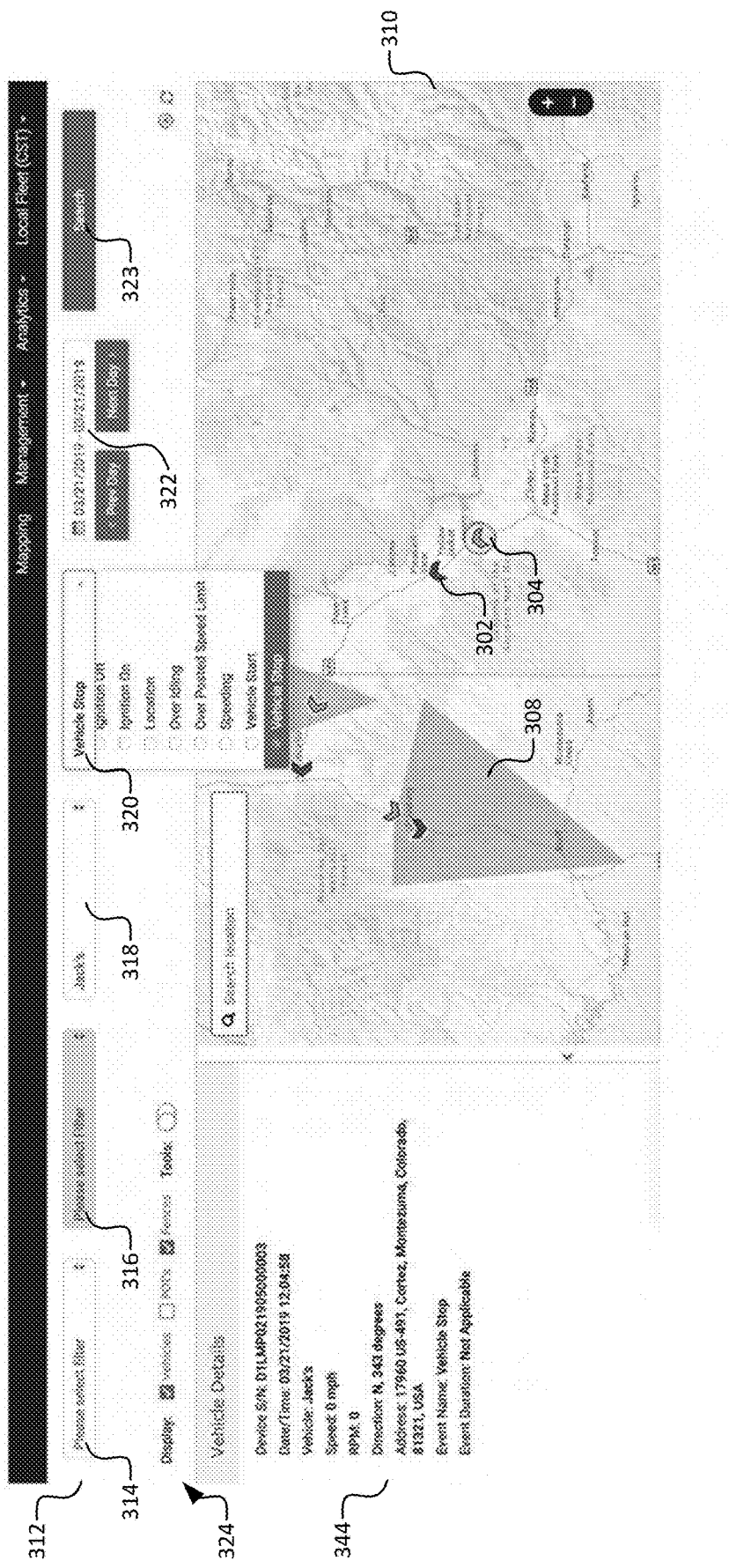
FIG. 5 is a screen shot that may be provided by the route management system of FIG. 1. showing a vehicle details section in addition to a map section and a drop-down menu section.

FIG. 5 is a screen shot 500 that may be provided by the route management system 100 of FIG. 1 showing a vehicle details section 344 in addition to the map section 310 and the drop-down menu section 312. The vehicle details section 344 includes various details about the vehicle and an actual visit event 304 identified. Some of the vehicle details include an electronic logging device number, the date and time, the name of the driver, the speed of the vehicle, the location and address of the vehicle, the event type (e.g., vehicle stop), etc.

From the foregoing, it will be appreciated that the above disclosed apparatus, methods, and articles of manufacture relate to telematics for vehicles that can be used for "last mile" deliveries, local distribution, and/or long haul applications. Last mile delivery is defined herein as the movement of goods to a final delivery destination. The telematics may be associated with accessing vehicle data and/or associated driver information. The vehicle data obtained may include GPS tracking, driver scorecards, and/or engine diagnostics.

To obtain the vehicle data, relatively small, plug-and-play cellular telematics devices can be used. These cellular devices provide the vehicle data to electronic logging systems that allow fleet managers to quickly and easily access data to monitor the location of their vehicles, how long their vehicles have been at a location (e.g., a job site), downtime, engine idling, and fuel consumption to provide up-to-the minute (and even second) updates. The systems may be configured to update every 30 seconds. However, other time periods may be selected (e.g., every 10 seconds). As a result, the disclosed examples allow for fleets to manage operating cost, make informed decisions and increase customer service. Put another way, the disclosed examples provide visibility of operations by identifying where a vehicle is located, when the vehicle arrived at a job site, and when a task was completed.

The processing of the vehicle data also provides real-time performance and safety reporting. For example, the alerts and reports generated can identify instances of speeding and hard stopping to allow feedback to be provided to those drivers that may benefit from additional training and/or coaching. Such training may lead to less vehicle maintenance and may extend the useful life of the vehicle.

The processing of the vehicle data also allows geo-fencing to be created as virtual boundaries around scheduled visit events (e.g., deliveries and/or service visits) and also to identify vehicle usage that deviates from a scheduled route. Thus, unauthorized vehicle usage may be minimized and driver productivity may be increased using the disclosed examples.

While examples of vehicle data are disclosed above, other examples exist. For example, the vehicle data captured by the electronic logging device and/or using the disclosed examples may additionally or alternatively include engine control unit history data, air supply pressure data, fuel consumption data, trip information data, vehicle speed data, vehicle cruise control status data, engine cooling fan drive status data, vehicle service indication data, body control unity history data, engine oil level data, engine oil pressure data, engine idle operation data, turbocharger data, air start pressure data, steering wheel angle data, vehicle pitch data, vehicle yaw data, vehicle distance data, idle shutdown data, engine hours data, engine revolutions data, vehicle hours data, fuel consumption data, vehicle weight data, cruise control speed set data, engine temperature data, power takeoff information data, fuel economy data, tire condition data, ambient conditions data, inlet air condition data, exhaust condition data, vehicle electrical power condition data, transmission fluid level data, transmission fluid pressure data, brake information data, engine coolant level data, vehicle identification number data, crankcase pressure data, barometric pressure data, vehicle interior temperature data, air inlet temperature data, boost pressure data, intake manifold temperature data, air inlet pressure data, air filter differential pressure data, exhaust gas temperature data, coolant filter differential pressure data, instantaneous fuel economy data, average fuel economy data, fuel temperature data, turbo oil temperature data, total fuel used data, trip fuel data, injector metering rail pressure data, injection control pressure data, actual engine-percent torque data, accelerator pedal position data, percent load at current speed data, brake pedal position data, clutch pedal position data, water in fuel sensor data, etc.

Although the text herein discloses a detailed description of example methods, apparatus and/or articles of manufacture, it should be understood that the legal scope of the property right is defined by the words of the claims set forth at the end of this patent. Accordingly, the following detailed description is to be construed as examples only and does not describe every possible example, as describing every possible example would be impractical, if not impossible. Numerous alternative examples could be implemented, using either current technology or technology developed after the filing date of this patent. It is envisioned that such alternative examples would still fall within the scope of the claims.

Further, while several examples have been disclosed herein, any features from any examples may be combined with or replaced by other features from other examples. Moreover, while several examples have been disclosed herein, changes may be made to the disclosed examples without departing from the scope of the claims.

What is claimed is:

1. A computer implemented method, comprising:
   receiving, by one or more processors of a computer server:
   (1) vehicle data from an electronic data bus of a vehicle via an electronic logging device electrically coupled to the electronic data bus, wherein the vehicle data includes electronic data generated by the vehicle; and
   (2) global positioning data of the vehicle captured via a global positioning device carried by the vehicle, the global positioning data including locations of the vehicle and times that the vehicle is at the respective locations;
   analyzing, via the one or more processors, the electronic data generated by the vehicle to identify one or more state changes of the vehicle indicating start-and-stop events of the vehicle;
   analyzing, via the one or more processors, respective details for each of the start-and-stop events with respect to one or more criteria to identify which of the start-and-stop events correspond to actual visit events that satisfy the criteria and non-actual visit events that do not satisfy the criteria;
   identifying, via the one or more processors, the locations and the times from the global positioning data that correspond to the actual visit events;
   correlating, via the one or more processors, the locations and the times of the vehicle with respective ones of the actual visit events, wherein the correlating includes generating an actual events record including at least some of the respective ones of the actual visit events;
   comparing, via the one or more processors, the actual events record to a scheduled events record to determine matching events between the actual events record and the scheduled events record;
   updating, via the one or more processors, the scheduled events record to indicate that the matching events have been completed;
   generating, via the one or more processors and in response to the updating, a report that contains at least a portion of the scheduled events record as updated; and
   transmitting, via the one or more processors, the report to one or more electronic user devices in real-time in response to generating the report.

2. The method of claim 1, further comprising generating, via the one or more processors, the scheduled events record, the scheduled events record identifying scheduled visit events and defining geographic areas around the scheduled visit events.

3. The method of claim 2, further comprising assigning, via the one or more processors, the vehicle to one or more of the scheduled visit events in the scheduled visit events record.

4. The method of claim 2, further comprising identifying the matching events by comparing, via the one or more processors, the locations of the actual visit events to the geographic areas around the scheduled visit events to identify the locations of the actual visit events that are within the geographic areas around the scheduled visit events.

5. The method of claim 4, further comprising updating the scheduled visit events record to include the locations and the times for the scheduled visit events that have a corresponding actual visit event.

6. The method of claim 5, wherein the times that correspond to the actual visit events comprise durations that the vehicle is at the respective actual visit events, and wherein the scheduled visit events have an associated time window, further comprising comparing the durations of the actual visit events to the corresponding time windows to identify ones of the durations that are greater than the time window.

7. The method of claim 6, further comprising:
generating, via the one or more processors, an alert notification, the alert notification identifying the actual visit events having the duration that is greater than the time window of the corresponding scheduled visit event; and
transmitting, via the one or more processors, the alert notification to the one or more electronic user devices in real time for display, by the one or more electronic user devices, on a respective display thereof.

8. The method of claim 4, further comprising generating an alert identifying the scheduled visit events that do not correspond to one of the actual visit events.

9. The method of claim 1, wherein the times comprise dates, times, and durations of the actual visit events, and further comprising including, within the actual events record, the locations of the vehicle at the actual visit events and corresponding dates, times, and durations.

10. The method of claim 1 wherein the one or more electronic user devices include one or more of a mobile device, a cellular and/or mobile smart phone, a tablet, a computer, a wearable device, or an internet appliance.

11. The method of claim 1 wherein the one or more electronic user devices are a component of the vehicle.

* * * * *